B. E. REED AND J. E. CLIPPINGER.
TRACTOR PLOW.
APPLICATION FILED APR. 17, 1919.

1,369,469.

Patented Feb. 22, 1921.
4 SHEETS—SHEET 2.

WITNESSES
Jas. K. McCathran
F. T. Chapman.

Benjamin E. Reed, INVENTORS
J. E. Clippinger,
BY
C. G. Siggers
ATTORNEY

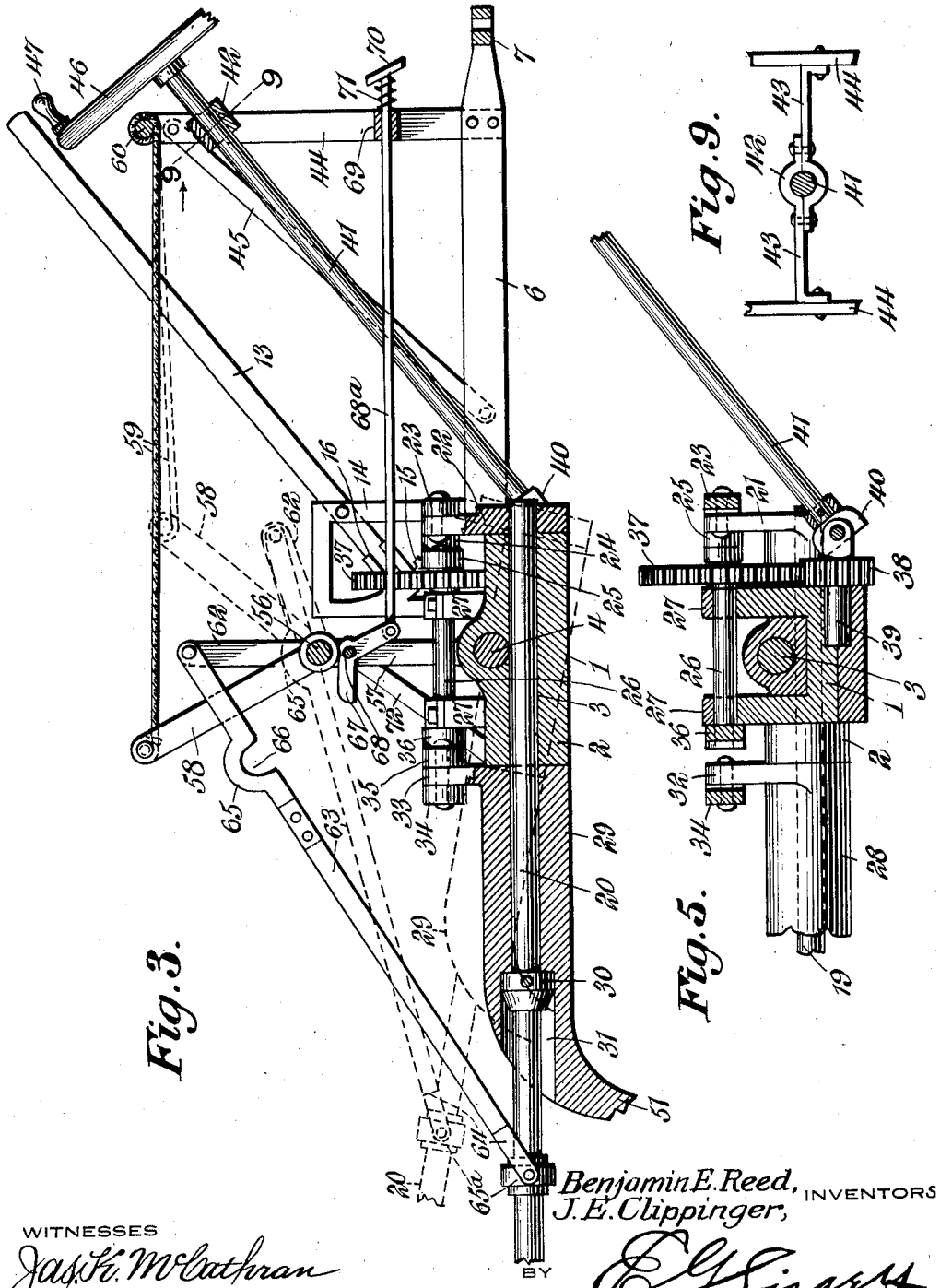

B. E. REED AND J. E. CLIPPINGER.
TRACTOR PLOW.
APPLICATION FILED APR. 17, 1919.
1,369,469.
Patented Feb. 22, 1921.
4 SHEETS—SHEET 4.
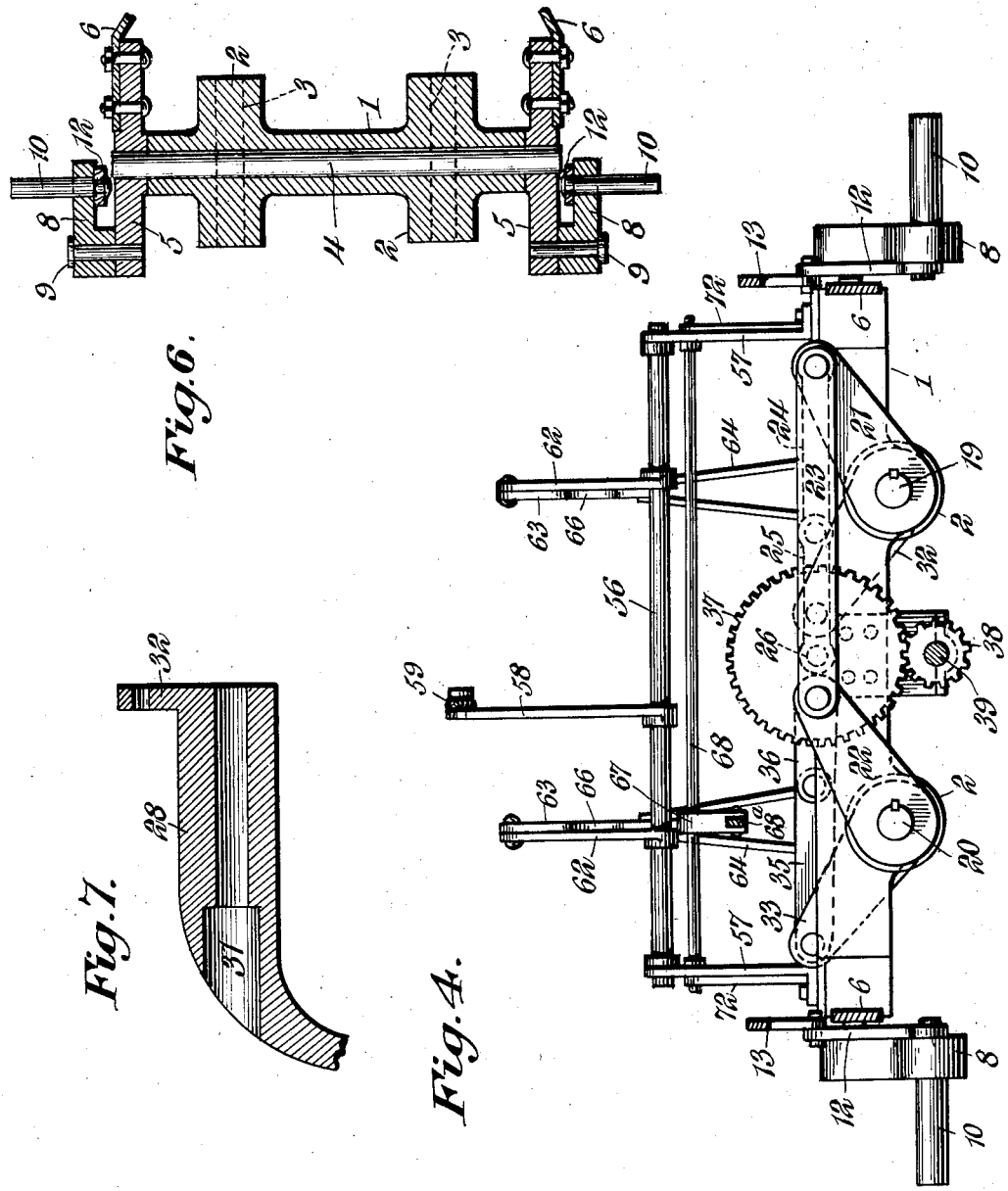
WITNESSES
Benjamin E. Reed,
J. E. Clippinger,   INVENTORS
BY
ATTORNEY

UNITED STATES PATENT OFFICE.

BENJAMIN E. REED, OF MARCUS HOOK, AND JOHN E. CLIPPINGER, OF PHILADELPHIA, PENNSYLVANIA.

TRACTOR-PLOW.

1,369,469.  Specification of Letters Patent.  Patented Feb. 22, 1921.

Application filed April 17, 1919. Serial No. 290,729.

*To all whom it may concern:*

Be it known that we, BENJAMIN E. REED and JOHN E. CLIPPINGER, citizens of the United States, residing, respectively, at Marcus Hook and Philadelphia, in the respective counties of Delaware and Philadelphia and State of Pennsylvania, have invented a new and useful Tractor-Plow, of which the following is a specification.
This invention has reference to tractor plows, and its object is to provide a plow which will operate upon any size field without leaving any dead furrows or even marks of either the plow or tractor, being so constructed that the whole field or piece of ground is plowed without moving upon any part of the plowed ground.

The invention comprises a suitable vehicle carrying plows which may be arranged right and left so that the tractor plow may be drawn over the field from side to side, requiring only the turning around of the vehicle at each side of the field, suitable mechanism operable from the driver's seat being provided to lift one set of plows out of action while the other set is lowered into active position. In this manner, with the sets of plows rights and lefts a field may be plowed across, then the plow turned about and the field plowed across in the opposite direction with the plowing always on the land side of the completed furrows and with the tractor traveling on unplowed ground. The result is that because of the alternation of the furrows the whole field may be plowed without producing any dead furrows, and, since the tractor is always moving over unplowed ground, none of the plowed ground need be touched by the tractor or the plow.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Fig. 3 is a section on the line 3—3 of Fig. 2, omitting some distant parts.

Fig. 4 is a section on the line 4—4 of Fig. 2.

Fig. 5 is a section on the line 5—5 of Fig. 2, omitting some distant parts.

Fig. 6 is a detail section through the main housing for the plow supports.

Fig. 7 is a detail view of a portion of one of the rockable plow beams.

Fig. 8 is a detail view showing another rockable plow beam, which, in the completed structure, traverses and carries the beam shown in Fig. 7.

Fig. 9 is a section on the line 9—9 of Fig. 3.

Fig. 10 is a perspective view of a portion of the mechanism for moving the plows into and out of operative position.

Figure 1:
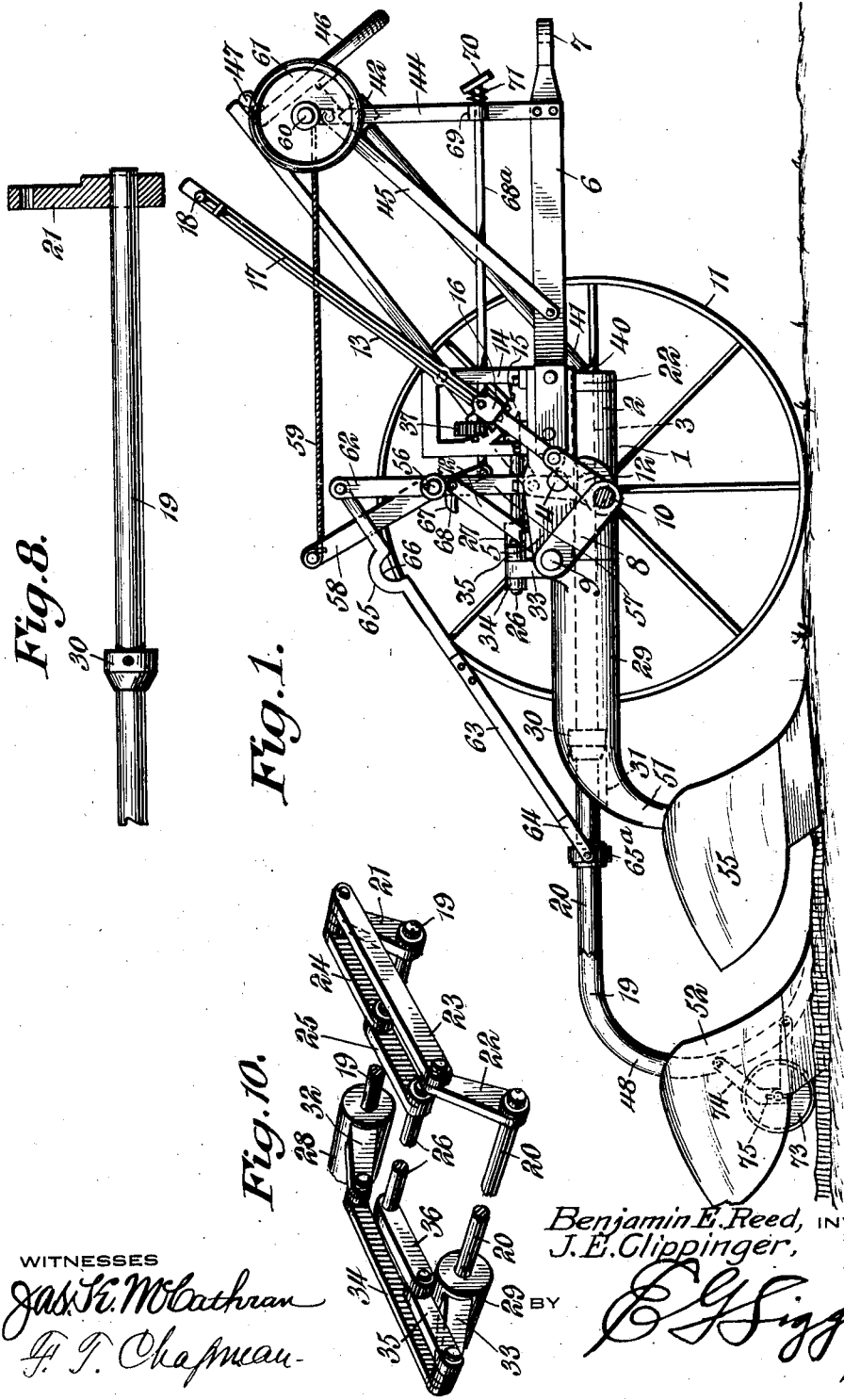
Figure 1 is an elevation of the tractor plow, with some near parts removed to avoid hiding more distant parts.

Referring to the drawings, there is shown a casting 1 constituting the main housing for certain parts. This housing has projections 2 from opposite sides with passages 3 therethrough. To one side of the projections 2, with their passages 3, and extending lengthwise of the housing is an arbor 4 projecting beyond the ends of the housing. Keyed to each end of the arbor 4 is a casting 5 projecting forwardly and rearwardly therefrom. At the forward ends of the castings 5 there are secured the rear ends of a yoke 6, with the sides approaching and ultimately uniting at 7 and there shaped to receive a link or other connection with a traction engine, which latter, however, is not shown in the drawings.

To the rear end of each casting 5 there is connected one end of an arm 8 by means of a pin or bolt 9 constituting a pivot for the arm 8. The other end of the arm 8 has a stub axle 10 fast thereto and each stub axle carries a wheel 11 which may constitute the furrow wheel or the land wheel, as the case may be. Mounted at one end upon each stub axle is a link 12, the other end of which is connected to one end of a lever 13 pivoted to a frame 14 erected on the forward part of the casting 5. The frame 14 is provided with a toothed segment 15 curved about the axis of the pivot of the lever 13, and the lever carries a locking pawl 16 under the control of an operating rod 17 terminating in a manipulating end 18 adjacent to that end of the lever 13 remote from the pawl or latch. There are two such levers and lock means therefor, one lever for each stub axle, so that the stub axles may be independently raised and lowered about the pivotal axis 9 to adjust the furrow and land wheels as desired.

Extending through the passages 3 in the main housing 1 are rock shafts 19 and 20 respectively, constituting plow beams. At the forward end the rock shafts carry rock arms 21, 22 respectively, connected at the ends remote from the shafts by a link 23. One of the rock arms, say the rock arm 21, is connected by another link 24 to the outer end of a rock arm 25 made fast at the inner end to a shaft 26 extending lengthwise of the machine and mounted in bearings 27 carried by the main housing 1. The two rock shafts or plow beams 19 and 20 extend through respective plow beams 28 and 29 at the rear of the projections 2 of the main housing 1, and each shaft 19 and 20 has a collar 30 fast thereto and located in a counterbore 31 of the beam 28 or 29, as the case may be, the shaft extending rearwardly beyond the beam. In this manner each shaft 19 and 20 is mounted to rock in the main housing 1 and each beam 28 and 29 is mounted to rock upon the respective shaft 19 or 20, as the case may be, and is held from longitudinal movement on the shaft by the housing 1 at the forward end and the collar 30 at the rear end. This construction gives ample bearing surface for both the shafts 19 and 20 and the beams 28 and 29, the rockable structures being carried by the main housing 1 which has ample front to rear length.

The beam 28 is provided with an arm 32 projecting from one side thereof and the beam 29 has a similar arm 33, the two arms being connected together by a link 34 so as to move simultaneously to the same extent. Pivoted to the arm 33 is a link 35 in turn connected to an arm 36 fast to the shaft 26 and projecting therefrom in a direction opposite to the direction of projection of the arm 25 from the same shaft.

Mounted on and fast to the shaft 26 is a gear wheel 37 in mesh with a pinion 38 carried by and fast to the short shaft 39 journaled in the main housing 1. Coupled to the shaft 39 by a universal joint 40 is a rod 41 carried forwardly and upwardly at a suitable angle and passed through a journal bearing 42 having side extensions 43 secured to uprights 44 rising from the yoke 6 and held steady by braces 45. The rod 41 carries a manipulating wheel 46 at its upper end, so located as to be within reach of an operator. The wheel 46 carries a handle 47 by means of which the wheel and with it the rod 41 may be rotated, thereby imparting rotative movements to the pinion 38, which in turn causes rotation of the gear wheel 37 and shaft 26 carrying it.

The rear end of each shaft 19 and 20 carries or is shaped into a plow standard 48 and 49 respectively. The rear end of each beam 28 and 29 is shaped into a plow standard 50 and 51 respectively. These plow standards carry plows 52, 53, 54 and 55, two of which, the plows 52 and 55, are right hand plows, and the other two of which, namely 53 and 54 are left hand plows. It will be understood, of course, that the particular number and arrangement of plows is not obligatory, since but two plows may be employed or more than four plows.

When the plowing operation is proceeding, two of the plows, say the right hand plows, are set to enter the ground and the other two plows are elevated so as to be out of operation, those plows out of operation being shown in the drawings as the left hand plows. When the tractor plow has traveled from one side, or one end, of the field to the other, the machine is turned around and started back upon unplowed ground next to the furrows just previously produced. Then the right hand plows 52 and 55 are lifted to the inoperative position and the left hand plows 53 and 54 are dropped to the operative position, whereupon, the plowing proceeds as before but in the opposite direction.

The change of the plows, when the machine is turned about, is accomplished by the operator by turning the wheel 46 in the proper direction. This results in a corresponding turning of the shaft 26, causing the arms 25 and 36 to both rock toward an upright central plane. The links 24 and 35 connected to the arms 25 and 36 produce rocking movements of the shaft 19 and beam 28 and also the shaft 20 and beam 29 in opposite directions. In the showing of the drawings, the plow 52 carried by the shaft 19 is rocked from the active position counter-clockwise into the inoperative position and at the same time the plow 55 is rocked from the active position to the inactive position in a clockwise direction. Simultaneously with these movements the beam 28 connected by the link 34 to the arm 33 is rocked in a clockwise direction to move the plow 54 to the ground and the shaft 20 is rocked through the link 23 and arm 22 in a counter-clockwise direction to move the plow 53 toward the ground. When the machine is turned around the wheels 11 are adjusted to correspond to the changed conditions, for the wheel which previously constituted the ground wheel now becomes the furrow wheel and the former furrow wheel now becomes the ground wheel, wherefore the levers 13 are appropriately adjusted.

In order to raise the plows from the ground so that the structure may be transported from place to place, there is provided a shaft 56 extending transversely of the machine and mounted at the ends in standards 57 erected on the castings 5. The shaft carries an arm 58 rising therefrom and to this arm there is attached one end of a strand 59, such as a manila or wire rope. The other end of the strand 59 is wound upon a drum 60 carried by the uprights 44, the drum constituting part of a shaft journaled in suitable bearings in the uprights 44 and carrying at one end a hand wheel 61. The shaft 56 is provided with upstanding arms 62 in line with the shafts 19 and 20 respectively, and each arm has pivoted to its upper end one end of a link 63 having the other end divided, as shown at 64, to straddle a swivel connection 65$^a$ fast on the shaft 19 or 20, as the case may be. At a suitable point in its length the link 64 is formed with a bowed portion 65 forming a recess 66 shaped to engage over the shaft 56. The arrangement is such that on rocking the shaft 56 in a direction to move the arms 62 forwardly the bowed portion 65 is brought over the shaft 56 into engagement therewith, forming an alined lock. At the same time the shafts 19 and 20 are rocked about the arbor 4 to an extent raising all the plows bodily from the ground. The lock is of the over-center type so that until purposely disturbed the lock will hold during transportation of the machine from place to place. In order to move the lock from the holding to the inactive position, a throw-off, in the form of an angle lever, 67 is provided, this lever being mounted upon a rod 68 extending between the uprights 57. The throw-off 67 has fast thereto a rod 68$^a$ extending forwardly and carried by a guide 69 on one of the uprights or standards 44. The rod 68$^a$ terminates in a pedal 70 between which and the guide 69 there is interposed a spring 71 tending to hold the throw-off lever 67 in the inactive position. The uprights 57 are strengthened by braces 72.

Figure 2:
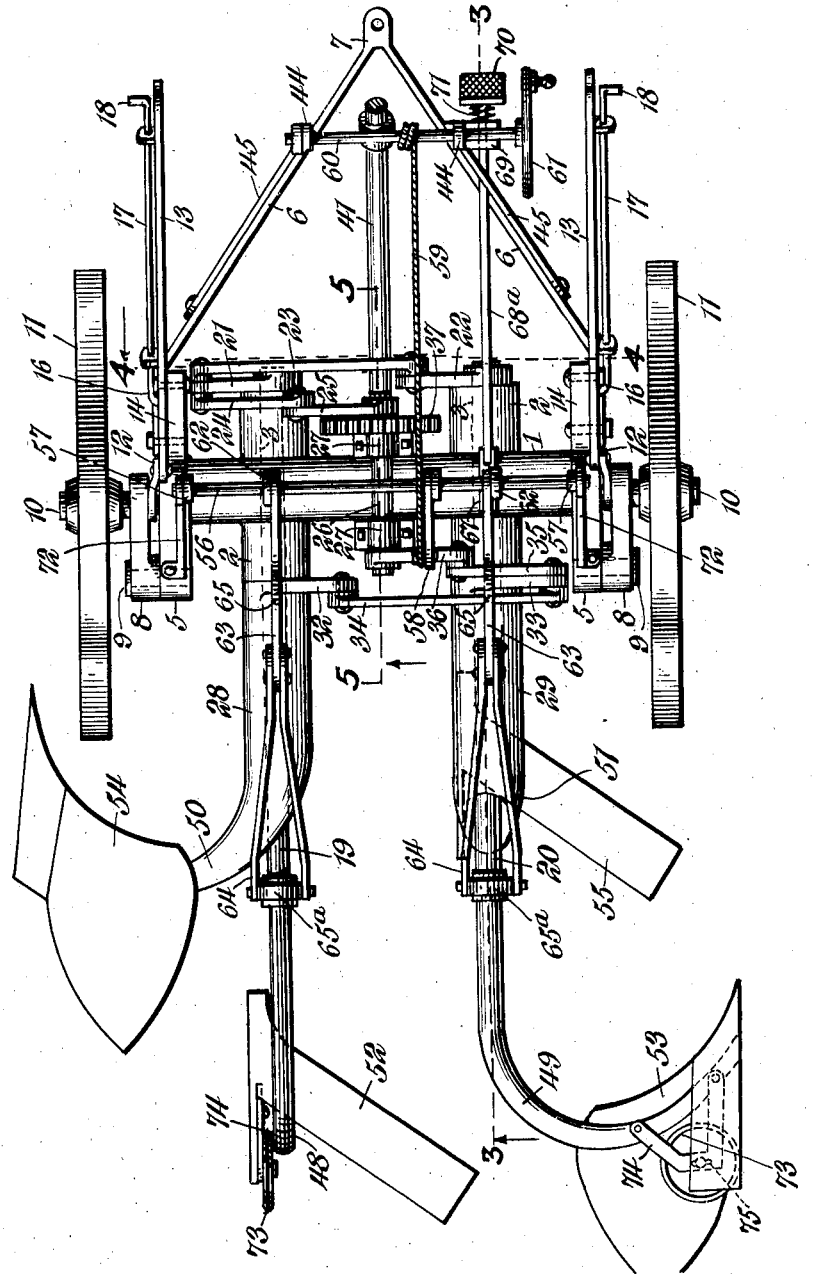
Fig. 2 is a plan view of the tractor plow, with one set of the plows in active position and the other set lifted out of active position.

The two plows carried by the shafts 19 and 20 are provided with depth wheels 73, being connected to the plows by brackets 74, shown in Figs. 1 and 2. It is unnecessary to provide the other two plows with depth wheels, since the depth wheel 73 of each plow 52 or 53, as the case may be, sustains the other active plow in proper working position. For this reason the windlass, comprising the shaft 60 with its hand wheel 61, needs no particular holding means in the nature of a pawl and ratchet in order to prevent the plows from entering more deeply than desired into the ground. The depth to which the plows will enter the ground may be changed by adjusting the brackets 74, each of which has a slot 75 permitting up and down adjustment of the depth wheel 73.

What is claimed is:—

1. In a plow structure, a plow beam, another plow beam extending through the first plow beam concentric therewith, and means for rocking the beams with respect to each other about their common axis.

2. In a plow structure, a plow beam, another plow beam extending through the first plow beam concentric therewith, and means for rocking the beams in opposite directions with respect one to the other about their common axis.

3. In a plow structure, a plow beam, and another plow beam extending through the first beam concentric with and supporting said first named beam.

4. In a plow structure, a plow beam, and another longer plow beam extending through the first-named beam concentrically therewith, the angular positions of the two beams being adjustable with respect to each other.

5. In a plow structure, a plow beam, and another longer plow beam extending through the first-named beam concentrically therewith, said second beam constituting a support for the first beam whereby the first beam may oscillate upon the second beam.

6. In a plow structure, a plow beam, and another longer plow beam extending through the first named beam concentric therewith, said second beam constituting a support for the first beam, and both beams being rockable about their common axis.

7. In a plow structure, a plow beam rockable about an axis lengthwise thereof, another plow beam extending through and beyond the first plow beam and concentric with the axis of rotation thereof, said second plow beam being rockable about the same axis, and means for rocking the plow beams in opposite directions about their common axis.

8. In a plow structure, a plow beam, and another plow beam longer than and extending through the first plow beam and constituting the sole support therefor.

9. In a plow structure, a plow beam, and another plow beam extending through the first plow beam beyond both ends thereof and constituting the sole support therefor, both plow beams being rockable and having a common axis of rocking.

10. In a plow structure, pairs of plow beams arranged side by side, with one plow beam of a pair extending through another plow beam of the same pair and constituting the sole support therefor, the plows carried by each pair of plow beams being capable of turning the soil on opposite sides.

11. In a plow structure, pairs of plow beams arranged side by side, with the beams of a pair each rockable about an axis common to both beams of the pair.

12. In a plow structure, pairs of plow beams arranged side by side, with the beams of a pair rockable about a common axis in opposite directions.

13. In a plow structure, pairs of plow beams arranged side by side, with the beams of a pair rockable about a common axis in opposite directions, one plow beam of a pair carrying a right hand plow and the other beam of the same pair carrying a left hand plow.

14. In a plow structure, pairs of plow beams arranged side by side, one beam of each pair carrying a right hand plow and the other beam of the pair carrying a left hand plow, and the beams of a pair being each rockable about an axis common to both beams of the pair, and means for causing rocking of the beams to carry like plows toward or away from the ground simultaneously with the movement of the other like plows from or toward the ground.

15. In a plow structure, a pair of plow beams in concentric relation and both rockable about the common axis of the beams, one beam being of a length to extend entirely through and beyond the ends of the other beam, and a main body supporting the longer plow beam with the latter forming the sole support for the shorter plow beam.

16. In a plow structure, a main body, wheels carrying the main body, plow beams extending through and carried by the body and each rockable therein about an axis longitudinally of the plow beams, and other plow beams mounted on the first named plow beams and rockable about the same axes, and means for rocking the first and second named plow beams oppositely.

17. In a plow structure, a main body, plow beams extending through and carried by the body and each rockable therein about an axis longitudinally of the plow beams, and other plow beams mounted on the first named plow beams and rockable about the same axes, and means for rocking the first and second named plow beams oppositely, said main body being mounted to rock on an axis transverse of the plow structure for tilting the plow beams.

18. In a plow structure, a main body, plow beams extending through the main body and each carrying a plow and mounted in the main body to rock therein about an axis longitudinal of the plow beams, other plow beams mounted on the first named plow beams to rock about the same axes as the first named plow beams, wheels supporting the main body, and means connected to the plow beams to cause the first and second named plow beams to rock simultaneously in opposite directions.

19. In a plow structure, a main body, an arbor carrying the main body and on which the main body is rockable, wheels for supporting the arbor and each adjustable in an up and down direction with relation to the arbor, plow beams carried by the main body and rockable therein, each about a longitudinal axis, other plow beams carried by the first named plow beams and rockable thereon concentrically with the axes of the first named beams, and plows carried by the said beams.

20. In a plow structure, long and short plow beams associated in two pairs, with the long beam of one pair and the short beam of the other pair carrying right hand plows and the long beam of the second pair and short beam of the first pair carrying left hand plows.

21. In a plow structure, long and short plow beams associated in two pairs, with the long beam of one pair and the short beam of the other pair carrying right hand plows and the long beam of the second pair and short beam of the first pair carrying left hand plows, the beams of each pair being arranged concentrically to rock about an axis common thereto.

22. In a plow structure, long and short plow beams associated in two pairs, with the long beam of one pair and the short beam of the other pair carrying right hand plows and the long beam of the second pair and the short beam of the first pair carrying left hand plows, the beams of each pair being arranged concentrically to rock about an axis common thereto, and common operating means for imparting rocking movements to the plow beams and having separate connections to each plow beam.

23. In a plow structure, pairs of plow beams, with the beams of each pair in concentric relation to rock about a common axis, and common operating means for rocking the beams having separate connections to the beams.

24. In a plow structure, long and short plow beams arranged in pairs, with a pair comprising a long and a short beam having the long beam extending lengthwise through the short beam and both beams of a pair being in concentric relation and rockable about a common axis, and means for imparting rocking movements to the beams with said means having separate connections to respective beams.

25. In a plow structure, pairs of concentrically arranged plow beams, with one pair alongside of the other pair, the beams of each pair being rockable about a common axis longitudinal of the beams, and means for rocking the beams about their axes, comprising rock arms on the beams, links connecting the rock arms of like beams of the pairs together, and manipulating means with link connections to an arm of each pair of beams for the simultaneous movement of the beams about their axes of rocking.

26. In a plow structure, pairs of concentrically arranged plow beams, with one pair alongside of the other pair, the beams of each pair being rockable about a common axis longitudinal of the beams, and means for rocking the beams about their axes, comprising rock arms on the beams, links connecting the rock arms of like beams of the pairs together, and manipulating means with link connections to an arm of each pair of beams for the simultaneous movement of the beams about their axes of rocking, said manipulating means including gearing and a rotatable shaft connected to the gearing and having a hand wheel for rotating the shaft.

27. In a plow structure, plow beams arranged in pairs upon the structure, the beams of each pair being concentric and angularly adjustable with respect to each other, and means for turning one plow beam of each pair so that the turned plows will lie substantially horizontal with their points turned outwardly relatively to the plow structure.

28. In a plow, a wheeled structure, plow beams carried thereby and associated in pairs, each pair having a right and left hand plow, and means for lifting the right hand plows from the ground and lowering the left hand plows to the ground and vice versa, whereby the plowing of the ground is always on the land side of the completed furrows and the wheeled structure travels on unplowed ground.

In testimony, that we claim the foregoing as our own, we have hereto affixed our signatures.

BENJAMIN E. REED.
JOHN E. CLIPPINGER.

Witnesses:
HOMER SIPPLE,
HARRY B. GILMAN.